United States Patent
Bouckaert et al.

(10) Patent No.: US 7,894,455 B2
(45) Date of Patent: Feb. 22, 2011

(54) SYSTEMS AND METHODS FOR A SIGNALLING GATEWAY FOR CONNECTING NETWORKS

(75) Inventors: Philippe Bouckaert, Biot (FR); Stephane Barbier, Mouans-Sartoux (FR); Didier Desiderio, Le Cannet (FR)

(73) Assignee: Hewlett-Packard Development Company, L.P., Houston, TX (US)

( * ) Notice: Subject to any disclaimer, the term of this patent is extended or adjusted under 35 U.S.C. 154(b) by 649 days.

(21) Appl. No.: 11/093,714

(22) Filed: Mar. 30, 2005

(65) Prior Publication Data

US 2006/0221982 A1    Oct. 5, 2006

(51) Int. Cl.
| | |
|---|---|
| H04L 12/28 | (2006.01) |
| H04L 12/56 | (2006.01) |
| H04L 12/50 | (2006.01) |
| H04Q 11/00 | (2006.01) |
| G06F 1/00 | (2006.01) |
| G06F 11/30 | (2006.01) |

(52) U.S. Cl. ............... 370/401; 370/385; 370/395.41; 370/395.42; 713/340

(58) Field of Classification Search ............ 370/401, 370/385, 395.41, 395.42; 713/340
See application file for complete search history.

(56) References Cited

U.S. PATENT DOCUMENTS

| | | | | |
|---|---|---|---|---|
| 5,048,081 | A * | 9/1991 | Gavaras et al. | 379/230 |
| 6,130,876 | A * | 10/2000 | Chaudhuri | 370/228 |
| 6,157,635 | A * | 12/2000 | Wang et al. | 370/352 |
| 6,584,190 | B1 * | 6/2003 | Bressler | 379/230 |
| 6,606,379 | B2 * | 8/2003 | Khadri et al. | 379/221.1 |
| 6,744,866 | B1 * | 6/2004 | Nolting et al. | 379/133 |
| 7,110,359 | B1 * | 9/2006 | Acharya | 370/235 |
| 2001/0049730 | A1* | 12/2001 | Brendes et al. | 709/223 |
| 2002/0150115 | A1* | 10/2002 | Onvural et al. | 370/411 |
| 2003/0185374 | A1* | 10/2003 | Baker | 379/220.01 |
| 2004/0037318 | A1* | 2/2004 | Salin et al. | 370/469 |
| 2005/0111442 | A1* | 5/2005 | Delaney et al. | 370/357 |
| 2005/0122982 | A1* | 6/2005 | Li et al. | 370/395.41 |

FOREIGN PATENT DOCUMENTS

EP    1503553 A1 *  2/2005

* cited by examiner

*Primary Examiner*—Daniel J Ryman
*Assistant Examiner*—Andrew Oh

(57) ABSTRACT

A signalling gateway for connecting a first network to a second network, the signalling gateway being operable to, receive a signalling message from the first network, the message comprising destination information, read the destination information and, where the destination information corresponds to a predetermined value, forward the message to one of a first entity on the first network and a second entity on the second network in accordance with a distribution rule.

15 Claims, 4 Drawing Sheets

SYSTEMS AND METHODS FOR A SIGNALLING GATEWAY FOR CONNECTING NETWORKS

FIELD OF THE INVENTION

This invention relates to a signalling gateway, a method of handling messages for transmission between networks and a control element.

BACKGROUND OF THE INVENTION

A common problem when connecting networks is that of ensuring messages from one network are correctly routed to a destination on the other network. A particular example of this is in the connection of networks using Internet Protocol (IP) to the existing telephone switched circuit network (PSTN). The infrastructure uses very different technologies and protocol: for example a PSTN conventionally uses the SS7 protocol. It is desirable, where two such networks are linked, to reliably provide PSTN signalling over the IP network.

An approach to providing a reliable connection between IP and SS7 networks has been proposed by the Internet Engineering Task Force (IETF). This includes M3UA, which is a protocol for the transport of any MTP3 signalling over IP, and SUA which defines the protocol for the transport of any SCCP User Part signalling over IP. Two main entities are defined: the signalling gateway ("SG"), which is the connection point between the SS7 and IP networks, and the application server (AS) which is the software application provided on the IP network which it is desired to make available over the SS7 network. The protocols may be used to connect SS7-based signalling end points (SEP) with an IP based AS thus allowing SS7 networks to access IP based applications.

A function performed by the signalling gateway is to receive SS7 signalling messages and direct them to the appropriate AS. To do so, the SG identifies a routing key (RK) defined by the M3UA or SUA protocol, which uniquely identifies the AS in accordance with parameters in the SS7 message. In general, the RK parameters are found in the header of the SS7 message, although it may be desirable to take into account other elements of the message, such as a SMS originating number or even some aspect of the message content, in order to direct the message to the appropriate AS.

A problem with using the M3UA or SUA protocol arises when it is desired to migrate an application from a legacy entity on the SS7 network to an AS on the IP network. As the M3UA and SUA protocols only allow the matching of an application server to the parameters of an SS7 message, it is necessary to have a complete transition at one step between the legacy SS7 application and the new IP application provided on an AS. The protocols do not allow a smooth transition in which traffic can be shared between the legacy application on the SS7 network and the new application on the IP network.

SUMMARY OF THE INVENTION

According to a first aspect of the invention, we provide a signalling gateway for connecting a first network to a second network, the signalling gateway being operable to, receive a message from the first network, the message comprising destination information, read the destination information and, where the destination information corresponds to a predetermined value, forward the message to one of a first entity on the first network and a second entity on the second network in accordance with a distribution rule.

According to a second aspect of the invention we provide a method of handling messages between a first network and a second network, comprising the steps of, receiving a message from the first network, the message comprising destination information, reading the destination information and, where the destination information corresponds to a predetermined value, forwarding the message to one of a first entity on the first network and a second entity on the second network in accordance with a distribution rule.

According to a third aspect of the invention, we provide a control element for a signalling gateway, the control element being operable to receive a message comprising destination information, the control element being operable to select one of a first entity on a first network and a second entity on a second network in accordance with a distribution rule, and retrieve further destination information corresponding to the selected one of the first entity and second entity.

According to a fourth aspect of the invention, we provide a signalling gateway for connecting a first network to a second network, the signalling gateway being operable to receive a message from the first network, the message comprising destination information, the signalling gateway comprising reading means for reading the destination information and generating an output, and control means, identified by a predetermined value of the output, for selecting one of a first entity on the first network and a second entity on the second network in accordance with a distribution rule.

BRIEF DESCRIPTION OF THE DRAWINGS

An embodiment of the invention will now be described by way of example only with reference to the accompanying drawings wherein.

DETAILED DESCRIPTION OF THE PREFERRED EMBODIMENTS

Figure 1:
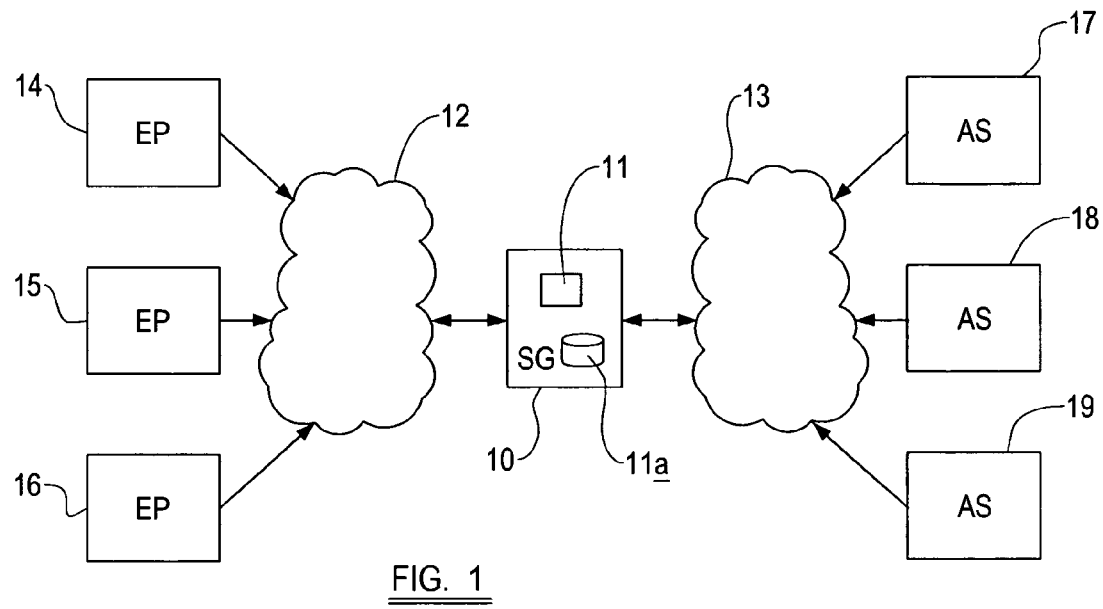
FIG. 1 is a diagrammatic illustration of a network including a signalling gateway embodying the present invention.
Figure 2:
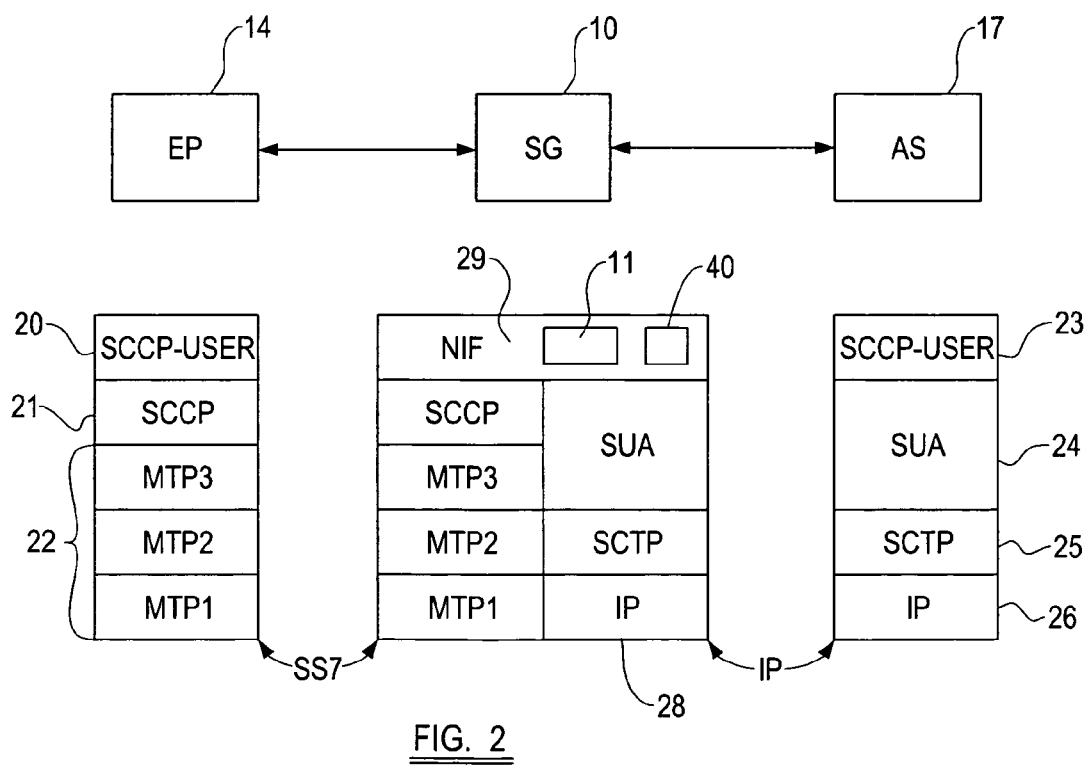
FIG. 2 is a diagrammatic illustration of the architecture of the network of FIG. 1.

Referring to FIG. 1, a signalling gateway embodying the present invention is shown at 10, provided with a routing key interpreter 11. The signalling gateway 10 is operable to communicate over a first network 12 and send and receive messages to and from end points on the network 12 using a first protocol, in this example using the SS7 protocol. The signalling gateway 10 is also able to communicate over the second network 13, in this example using the IP protocol. The signalling gateway 10 is operable to send and receive messages via the first network 12 from a plurality of end points 14, 15, 16, and to transmit and receive messages over the second network 13 from a plurality of application servers 17, 18, 19. As best seen in FIG. 2, the protocols used for transmitting messages over the first network 12 comprises a Signalling Connection Control Part (SCCP) User Part 20 over the SCCP 21 and then the appropriate Message Transfer Protocol (MTP) levels shown at 22. The application servers transmit messages using an SCCP User Part shown at 23 over a SCCP User Adaptation layer (SUA) 24, and uses the Stream Control Transmission Protocol (SCTP) 25 over the Internet Protocol (IP) layer 26. The signalling gateway architecture generally shown at 28 has a nodal interworking function (NIF) illustrated at 29 to convert SS7 messages to SUA messages and vice versa using the routing key interpreter generally indicated at 11. The signalling gateway 10 may sit between any other appropriate pair of protocols as desired; for example, the signalling gateway 10 may be operable convert SS7 signals to M3UA messages or otherwise as desired.

Each application server 17, 18, 19 has a unique routing key associated with it. The routing keys maybe configured statically at the application server 17, 18, 19 and at the signalling gateway, or maybe configured statically at the application server which then dynamically registers itself at the signalling gateway 10 by means of routing key management messages. The routing keys are stored in a store shown at 11a. To match a routing key to an incoming message, the routing key interpreter 11 is operable to read a message and identify the values of certain parameters within the message. The routing key interpreter 11 then identifies the routing key that matches the values of the parameters and returns an output.

In this example, the routing keys are of two types. The routing keys each comprise parameters and the parameter values to enable the routing key interpreter to match the routing key against the incoming messages, together with a destination part which includes further destination information identifying the application server to which the message is to be sent. The routing key may alternatively have a destination part which does not identify an application server but instead corresponds to a predetermined value, not a specified destination. Such routing keys may be regarded as pointing to a virtual destination. Thus, the output from the routing key interpreter 11 may comprise further destination information identifying an application server, or may comprise a virtual destination, matching a pre-determined value.

Figure 3:
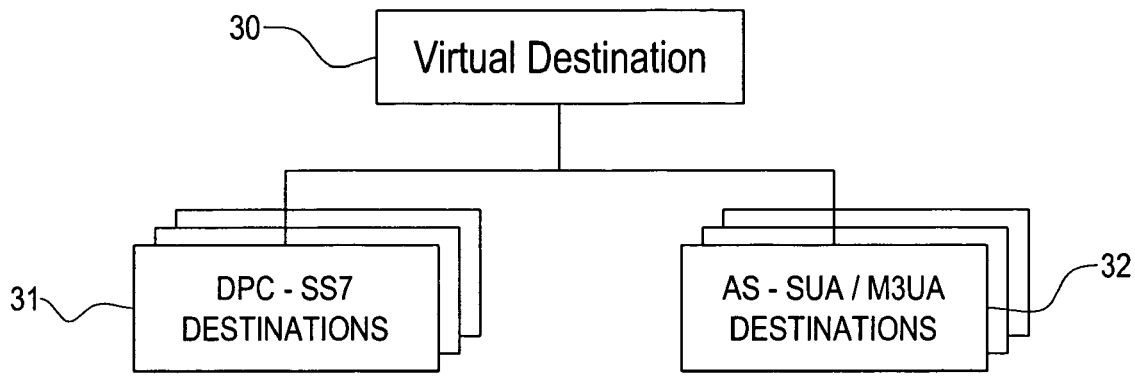
FIG. 3 is an illustration of a virtual destination.

The signalling gateway 10 further comprises configuration information, which is similarly held on the store 11a. The configuration information comprises a mapping between each predetermined value or virtual destination identified in the routing keys stored in the store 11a. As illustrated in FIG. 3 for each virtual destination illustrated at 30, the configuration information comprises first entity destination information 31 identifying at least one first entity on the first, SS7 network 12, and second entity destination information 32 identifying at least one second entity provided on the second, IP, network 13. As illustrated in FIG. 3, the destination information 31, 32 may identify a plurality of destinations corresponding to a plurality of entities on each network.

Figure 4:
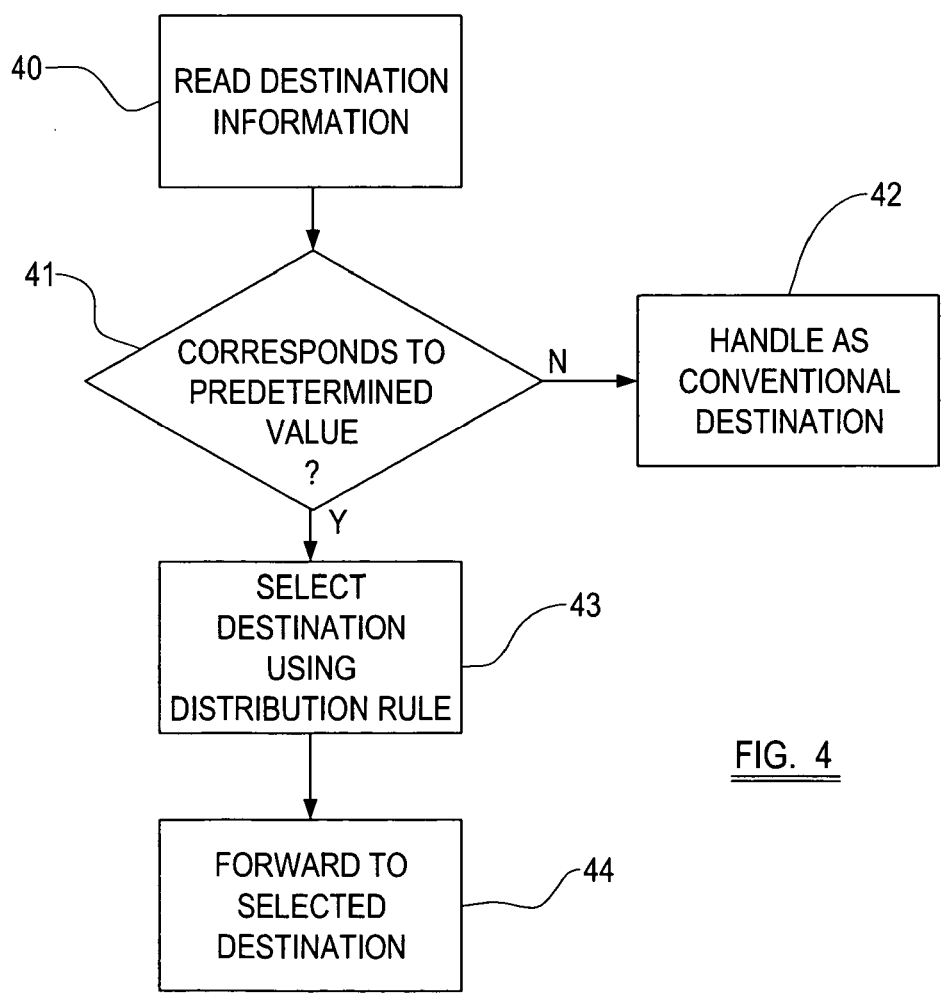
FIG. 4 is a flow diagram illustrating a method of handling a message, embodying the present invention.
Figure 5:
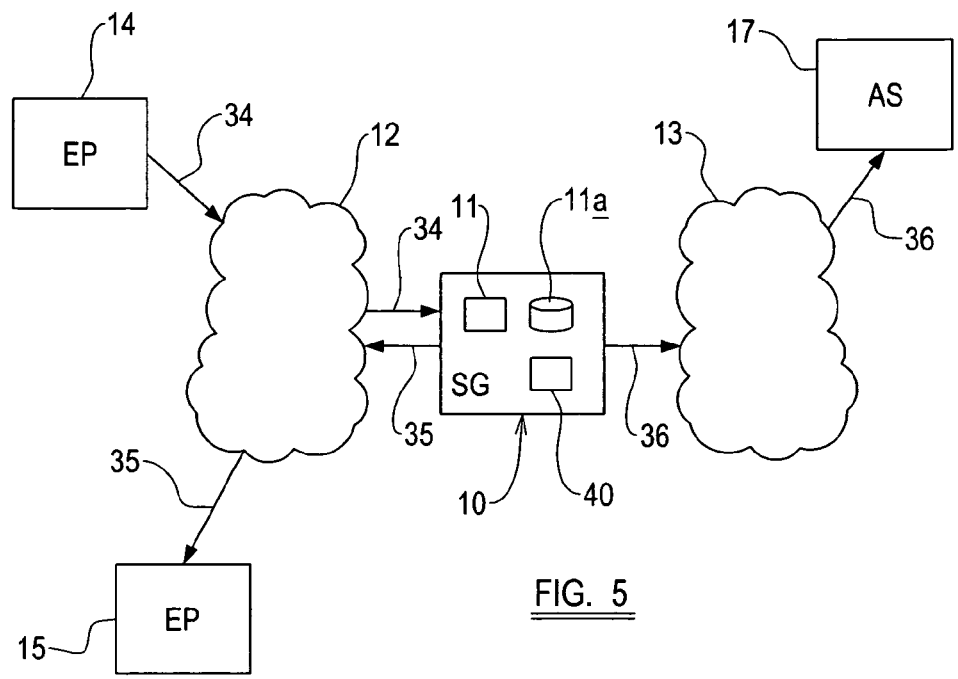
FIG. 5 is a diagrammatic illustration of message flow in part of the network of FIG. 1.

The operation of the signalling gateway 10 will now be illustrated with reference to FIGS. 4 and 5. Referring to FIG. 5, a signalling end point (SEP) 14 transmits an SS7 message generally illustrated at 34 via the SS7 network 12 to the signalling gateway 10. At step 40 of FIG. 4, the signalling gateway 10 reads the destination information included in the message, in the present example by passing the message to the routing key interpreter 11 and receiving the output from the routing key 11 interpreter. At step 41, the signalling gateway 10 checks whether the output from the routing key interpreter corresponds to a predetermined value, that is whether the output matches one of the virtual destinations 30 held on the store 11a. If not, then at step 42 the message is forwarded to the appropriate application server in a conventional manner. If however the output does correspond to a virtual destination 30, then at step 43 the signalling gateway 10 selects one of a first entity provided on the first, SS7 network 12 and a second entity provided on the second, IP network 13. In the example of FIG. 5, for simplicity, a single first entity, the SEP 15 and a single second entity, an AS 17 are shown but as discussed above there may be two or more entities on each network. The appropriate entity is selected in accordance with a distribution rule and the message is then forwarded, either to the first entity, SEP 15, as shown at 35 or to the second entity, AS 17, shown at 36, as illustrated at step 44. The step 43 of selecting a destination using a distribution rule is discussed in more detail below. The method of FIG. 4 may be performed by one or more processes or control elements or other software elements within the signalling gateway 10 so, for example, the step 43 of selecting a destination using a distribution rule may be performed by an appropriate control element generally shown at 40.

By expanding the definition of the routing key to permit the identification of virtual destinations 30 which map to at least one entity on each of the SS7 network 12 and IP network 13, the signalling gateway 10 can thus forward messages over either or both networks in response to any appropriate desired rule or criterion. A simple criterion may be that the message is broadcast to each entity identified in the destination information 31 or 32. Alternatively, load sharing rules may be used to distribute messages between the first entity or entities and second entity or entities as appropriate.

Figure 6:
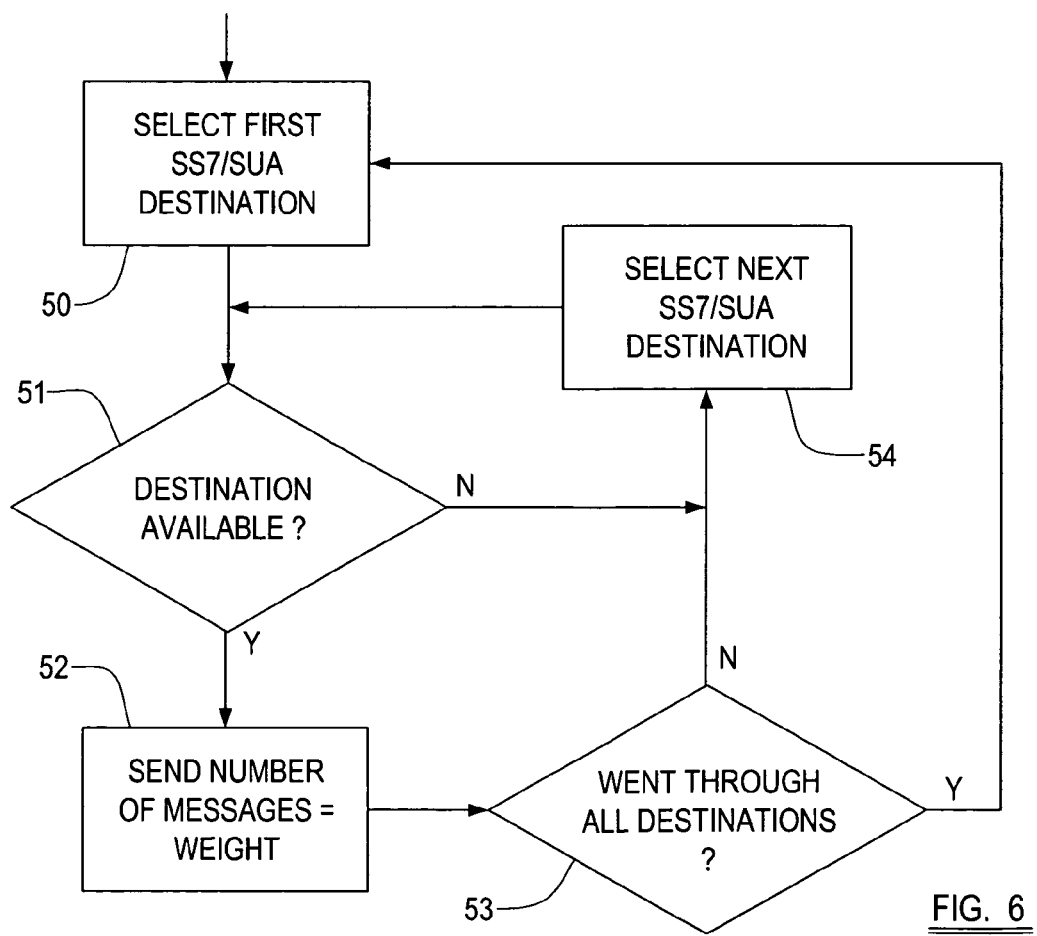
FIG. 6 is a flow diagram showing a first distribution rule.

A first method for distributing messages according to a load sharing distribution role is illustrated at FIG. 6. In this example, each entity identified in the destination information 31, 32 has an associated weight corresponding to the proportion or number of messages that entity can handle or is intended to handle. At step 50, one of the entities is selected, for example by working sequentially through a list and at step 51 a check is carried out as to the availability of that destination. If the entity is available then at step 52 a number of messages are sent to that entity corresponding to the weight of that entity. When sufficient messages have been sent, then at step 53 a check is performed to see whether or not all entities have been selected and, if not, at step 54 the next entity is selected and the steps 51, 52, 53 repeated. If at step 51 the entity is not available, then the method proceeds to step 54 where the next entity is selected. If at step 53 all entities have been selected then the method returns to step 50 and begins from the first entity. The method of FIG. 6 thus cycles through all possible entities, sending each available entity a proportion or number of messages depending on their stored weight.

Figure 7:
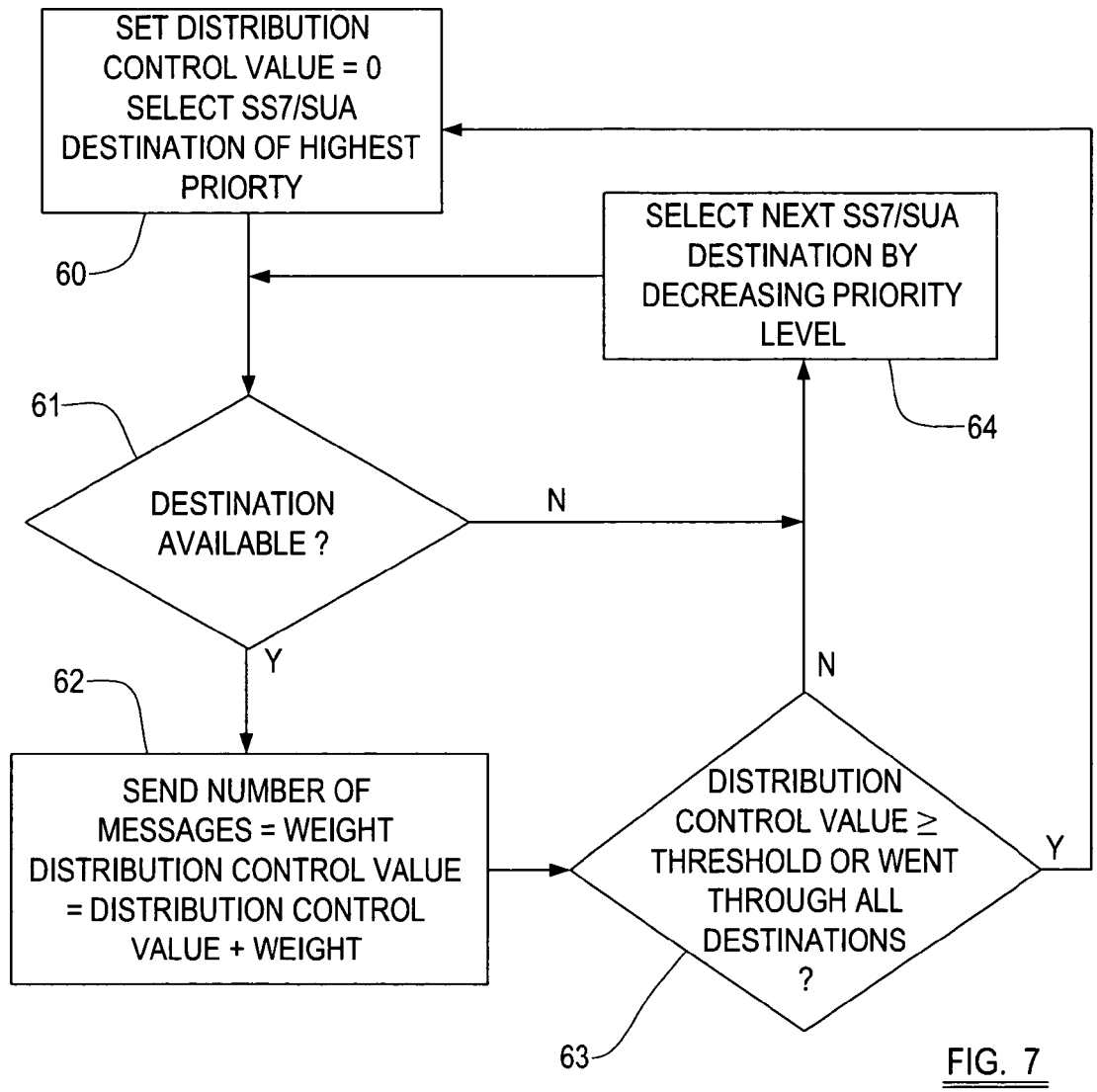
FIG. 7 is a flow diagram illustrating a second distribution rule.

FIG. 7 shows an alternative method of load sharing which takes into account a priority associated with each entity. The destination information 31, 32 includes a weight and a priority associated with each entity and also stores a threshold value. At step 60, a distribution control value is set to zero and the highest priority entity is selected. At step 61, the availability of the entity is checked, and at step 62 number of messages sent to that entity corresponding to the weight associated with that entity. The distribution control value is then increased by the weight associated with that entity, and at step 63 two checks are carried out. If the distribution control value is less than the threshold and not all entities have been selected, then at step 64, the next entity is selected in decreasing order of priority level and, if at step 61 the entity is available, steps 62 and 63 are repeated. If at step 63, the decreasing control value does exceed the threshold or all destinations have been selected, then the method returns to step 60 and starts with the highest priority destination again. The effect of this method is to ensure that messages are routed to the highest priority destination available whilst permitting some traffic to be diverted to lower priority destinations. By selecting the threshold value, the number of messages sent before the highest priority destination is re-selected can be chosen accordingly.

The method and signalling gateway of the present invention thus allows messages to be routed to entities on an SS7 network and an IP network in accordance with a load sharing rule by a simple extension to the routing key functionality. This allows, for example, legacy SS7 applications and replaces IP application to be run in parallel and messages distributed between them according to any desirable rule, thus allowing a gradual handover from legacy to replacement applications. The method and signalling gateway can also be used where it is desired simply to provided an application both on an SS7 application and an IP platform and share the traffic accordingly. Although the method described above particularly refers to the SUA protocol, it will be apparent that the invention may be used with the M3UA protocol, which uses a similar routing key procedure, or indeed any other protocol allowing interfacing of messages between two networks as desired.

In the present specification "comprise" means "includes or consists of" and "comprising" means "including or consisting of".

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. A signalling gateway for connecting a first network to a second network, the signalling gateway comprising:
   a control element operable to receive a message from the first network, the message including destination information; and
   a routing key interpreter operable to read the destination information and assign a routing key to the received message based upon the read destination information,
   wherein if the assigned routing key corresponds to a predetermined value that is not a destination, the control element is operable to forward the message to one of a first entity on the first network and a second entity on the second network in accordance with a distribution rule associated with the predetermined value,
   wherein each of the first entity and the second entity has an associated weight and an associated priority, and the control element is operable to:
      select one of the first entity or the second entity having the highest priority;
      forward a plurality of messages to the selected entity in accordance with the associated weight;
      select one of the first entity or the second entity having the next highest priority;
      store a distribution control value including a total weight associated with each entity selected; and
      when the distribution control value exceeds a selected threshold, reset the distribution control value and select one of the first entity or the second entity having the highest priority.

2. A signalling gateway according to claim 1, wherein the control element is operable to:
   read the assigned routing key from the routing key interpreter;
   where the assigned routing key includes a destination, forward the received message to that destination; and,
   where the assigned routing key includes the predetermined value, select one of the first entity and the second entity in accordance with the distribution rule.

3. A signalling gateway according to claim 1, wherein the control element is operable to select one of the first entity and the second entity retrieve further destination information corresponding to the selected entity, and forward the message to the selected one of the first entity and the second entity using the further destination information.

4. A signalling gateway according to claim 1 wherein the distribution rule includes transmitting the message to each of the first entity and the second entity.

5. A signalling gateway according to claim 1 wherein the first network includes an SS7 signalling network and the second network includes an IP network.

6. A method of handling messages between a first network and a second network, including the steps of:
   receiving a message from the first network, the message including destination information;
   reading the destination information;
   assigning a routing key to the received message based upon the read destination information; and,
   where the routing key corresponds to a virtual destination, forwarding the message to one of a first entity on the first network and a second entity on the second network in accordance with a distribution rule, the first entity and the second entity associated with the virtual destination,
   wherein each of the first entity and the second entity has an associated weight and an associated priority, and the method further includes the steps of:
      selecting one of the first entity or the second entity having the highest priority;
      forwarding a plurality of messages to the selected entity in accordance with the associated weight;
      selecting one of the first entity or the second entity having the next highest priority;
      storing a distribution control value including a total weight associated with each entity selected; and
      when the distribution control value exceeds a selected threshold, resetting the distribution control value and selecting one of the first entity or the second entity having the highest priority.

7. The method of claim 6 including the steps of:
   forwarding the destination information to a routing key interpreter;
   receiving the assigned routing key from the routing key interpreter; and,
   where the assigned routing key includes the virtual destination, selecting one of the first entity and the second entity in accordance with the distribution rule;
   receiving further destination information corresponding to the selected one of the first entity and the second entity; and
   forwarding the message in accordance with the further destination information.

8. A method according to claim 6 wherein the distribution rule includes transmitting the message to each of the first entity and the second entity.

9. A signalling gateway according to claim 6 wherein the first network includes an SS7 signalling network and the second network includes an IP network.

10. A signalling gateway comprising:
   a control element operable to receive a message including destination information; and a routing key interpreter operable to assign a routing key to the received message based upon the destination information, wherein if the assigned routing key corresponds to a virtual destination, the control element is operable to select one of a first entity on a first network and a second entity on a second network in accordance with a distribution rule, the first entity and the second entity associated with the virtual destination, wherein the control element is operable to retrieve further destination information corresponding to the selected one of the first entity and the second entity, and wherein each of the first entity and the second entity has an associated weight and an associated priority, and the control element is operable to:

select one of the first entity or the second entity having the highest priority;

forward a plurality of messages to the selected entity in accordance with the associated weight;

select one of the first entity or the second entity having the next highest priority;

store a distribution control value including a total weight associated with each entity selected; and when the distribution control value exceeds a selected threshold, reset the distribution control value and select one of the first entity or the second entity having the highest priority.

11. A signalling gateway for connecting a first network to a second network, the signalling gateway comprising:

a control element operable to receive a message from the first network, the message including destination information; and a routing key interpreter operable to read the destination information, wherein if the destination information corresponds to a predetermined value that is not a destination, the control element is operable to forward the message to one of a first entity on the first network and a second entity on the second network in accordance with a distribution rule associated with the predetermined value, each of the first entity and the second entity has an associated weight and an associated priority;

wherein the control element is further operable to:
      select one of the first entity or the second entity having the highest priority;
      forward a plurality of messages to the selected entity in accordance with the associated weight;
      select one of the first entity or the second entity having the next highest priority;
      store a distribution control value including a total weight associated with each entity selected; and,
      when the distribution control value exceeds a selected threshold, reset the distribution control value and select one of the first entity or the second entity having the highest priority value.

12. A signalling gateway according to claim 11, wherein the routing key interpreter is operable to read the destination information and generate an output.

13. A signalling gateway according to claim 12, wherein the control element is operable to:
   read the output from the routing key interpreter;
   where the output includes a destination, forward the received message to that destination; and,
   where the output includes the predetermined value, select one of the first entity and the second entity in accordance with the distribution rule.

14. A method of handling messages between a first network and a second network, including the steps of:
   receiving a message from the first network, the message including destination information;
   reading the destination information; and,
   where the destination information corresponds to a virtual destination, forwarding the message to one of a first entity on the first network and a second entity on the second network in accordance with a distribution rule, the first entity and the second entity associated with the virtual destination, each of the first entity and the second entity having an associated weight and an associated priority;
   the method further including the steps of:
      selecting one of the first entity or the second entity having the highest priority;
      forwarding a plurality of messages to the selected entity in accordance with the associated weight; and
      selecting one of the first entity or the second entity having the next highest priority;
      storing a distribution control value including a total weight associated with each entity selected; and,
      when the distribution control value exceeds a selected threshold, resetting the distribution control value and selecting one of the first entity or the second entity having the highest priority.

15. The method of claim 14 including the steps of:
   forwarding the destination information to a routing key interpreter;
   receiving an output from the routing key interpreter; and,
   where the output includes the virtual destination, selecting one of the first entity and the second entity in accordance with the distribution rule;
   receiving further destination information corresponding to the selected one of the first entity and the second entity; and
   forwarding the message in accordance with the further destination information.

\* \* \* \* \*

UNITED STATES PATENT AND TRADEMARK OFFICE
CERTIFICATE OF CORRECTION

| | |
|---|---|
| PATENT NO. | : 7,894,455 B2 |
| APPLICATION NO. | : 11/093714 |
| DATED | : February 22, 2011 |
| INVENTOR(S) | : Philippe Bouckaert et al. |

It is certified that error appears in the above-identified patent and that said Letters Patent is hereby corrected as shown below:

In column 6, line 6, in Claim 3, delete "second entity" and insert -- second entity, --, therefor.

In column 8, line 4, in Claim 11, delete "priority value." and insert -- priority. --, therefor.

Signed and Sealed this
Twenty-seventh Day of December, 2011

David J. Kappos
*Director of the United States Patent and Trademark Office*